Dec. 7, 1948.　　　　J. B. SUTTON　　　　2,455,391
ROUND STRAIGHTENER
Filed Oct. 25, 1946　　　　　　　　　　12 Sheets-Sheet 3
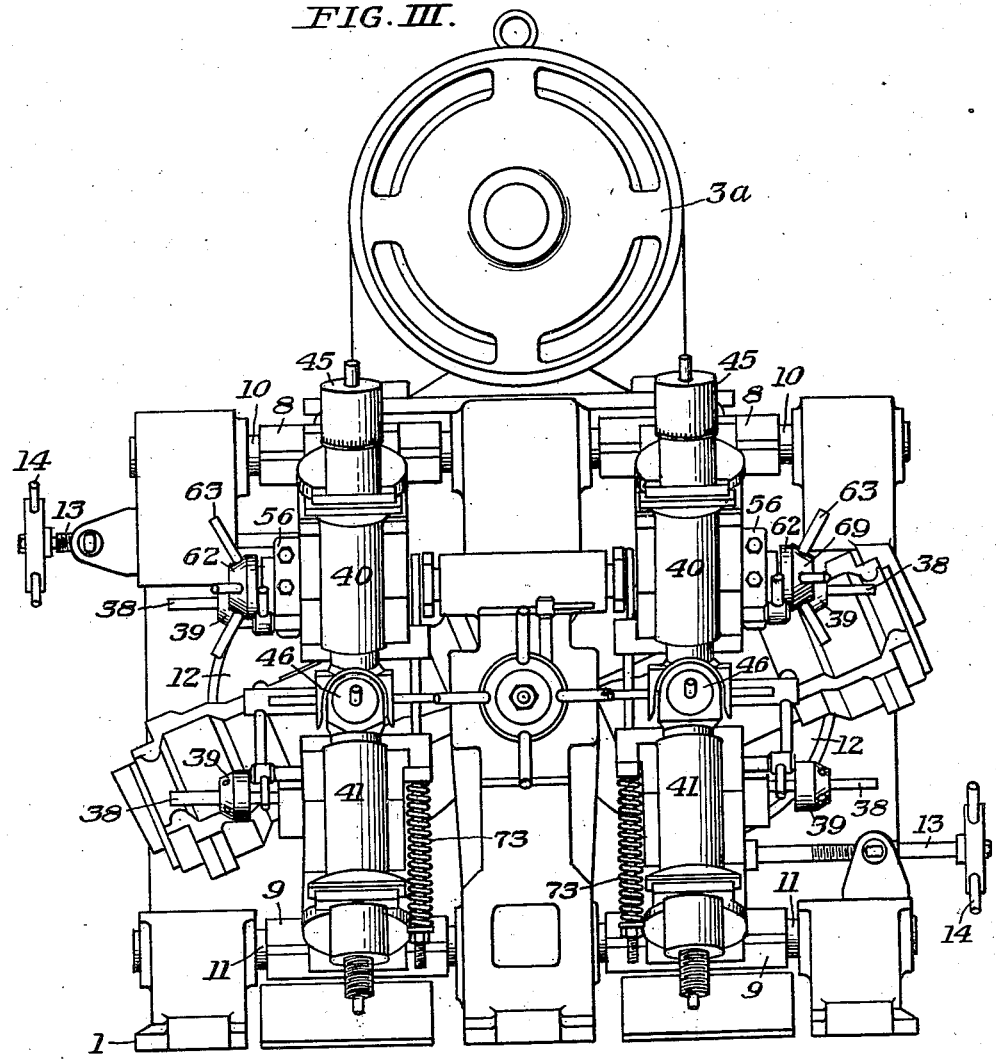
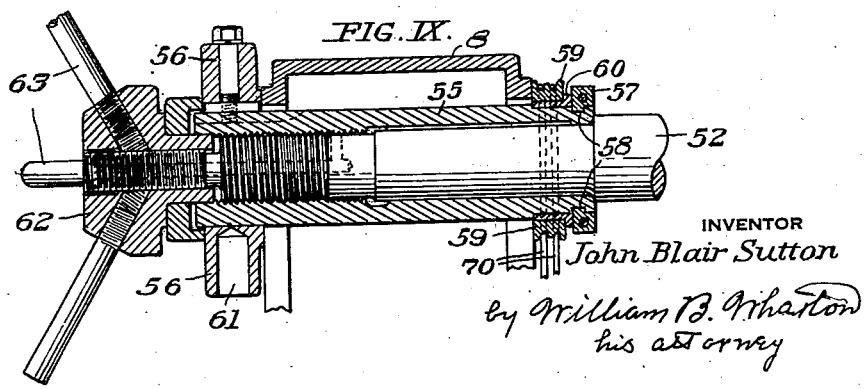
INVENTOR
John Blair Sutton
by William B. Wharton
his attorney Dec. 7, 1948.                J. B. SUTTON                2,455,391
                          ROUND STRAIGHTENER
Filed Oct. 25, 1946                                12 Sheets-Sheet 4
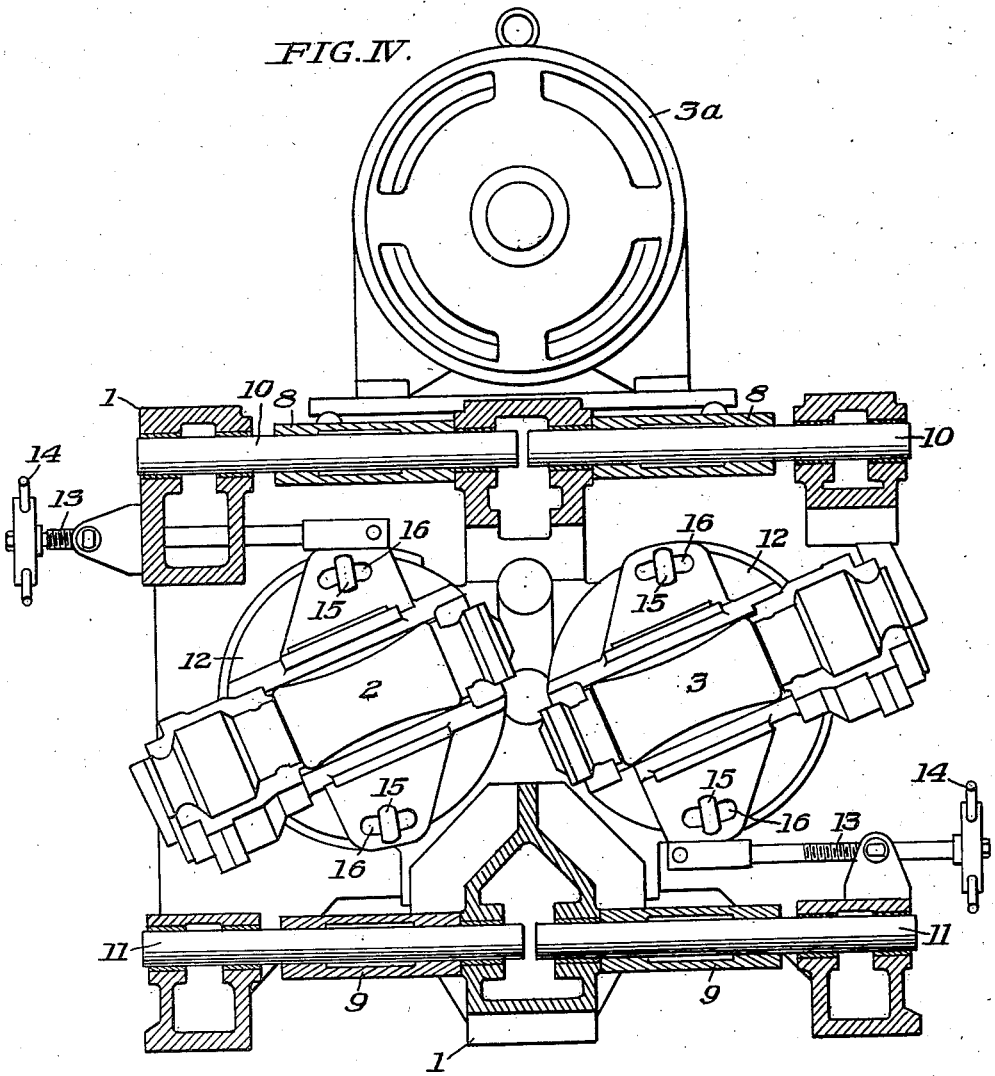
INVENTOR
John Blair Sutton
by William B. Wharton
his attorney Dec. 7, 1948.　　　　J. B. SUTTON　　　　2,455,391
ROUND STRAIGHTENER
Filed Oct. 25, 1946　　　　　　　　　　　　12 Sheets-Sheet 5
FIG. V.
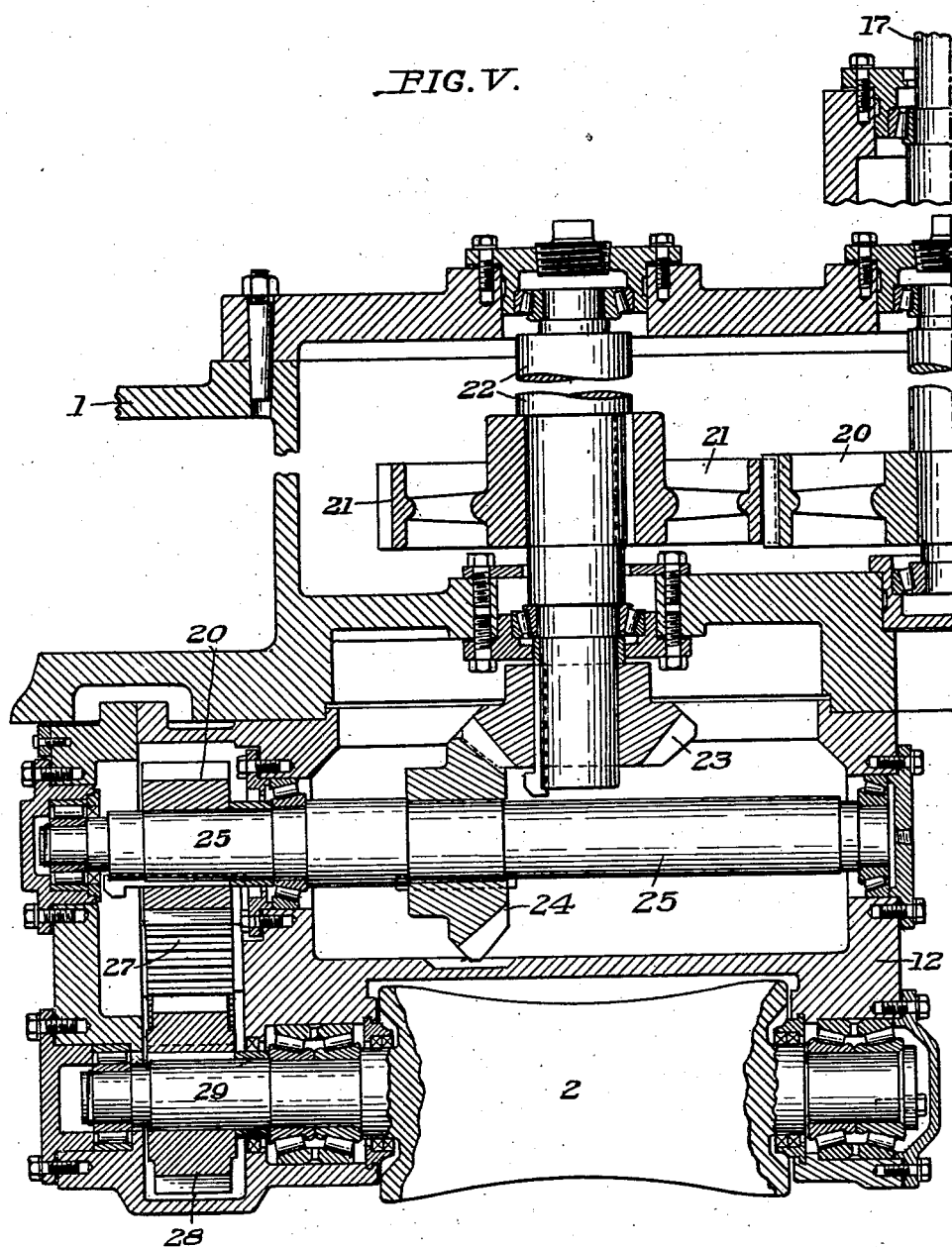
INVENTOR
John Blair Sutton
by William B. Wharton
his attorney

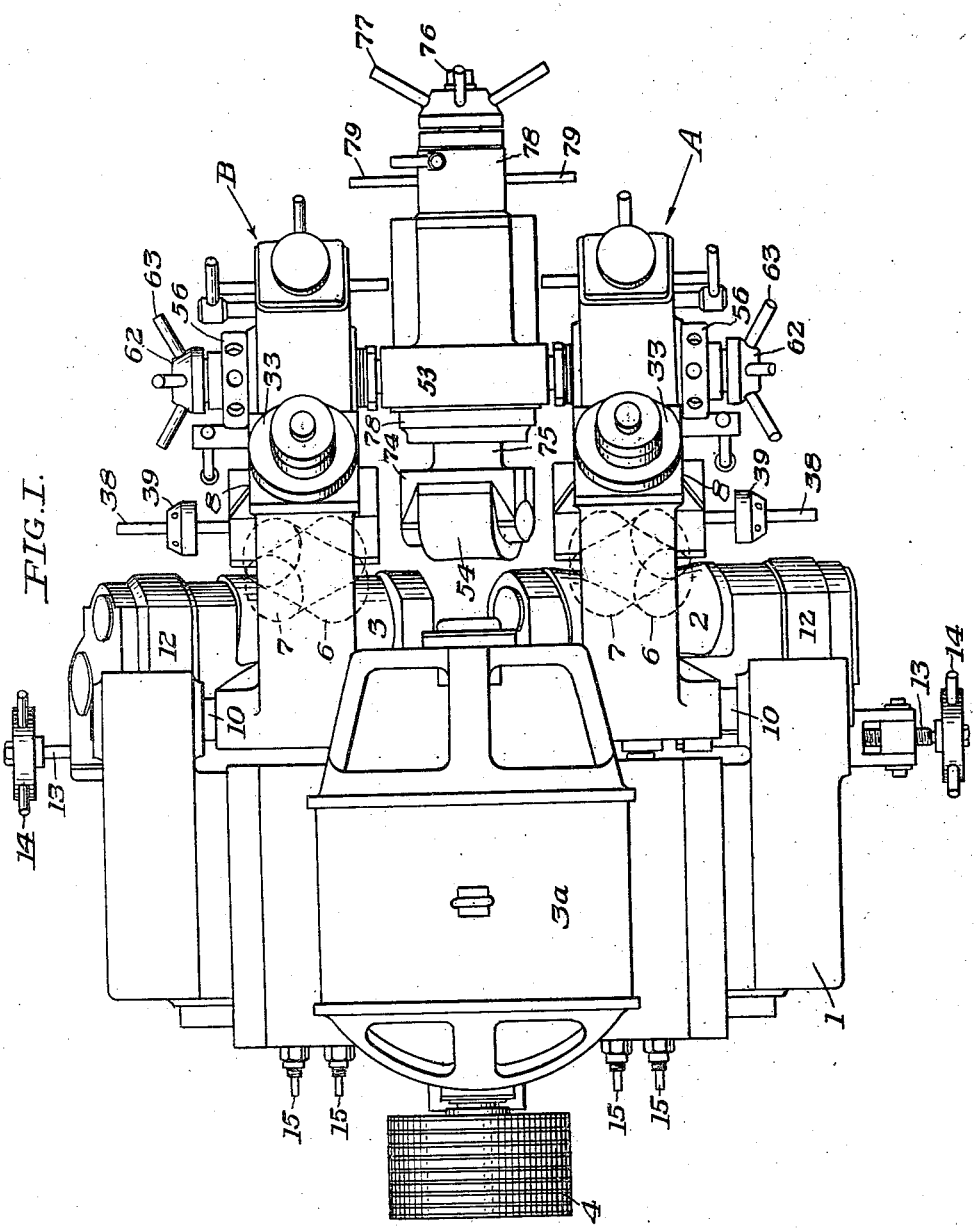

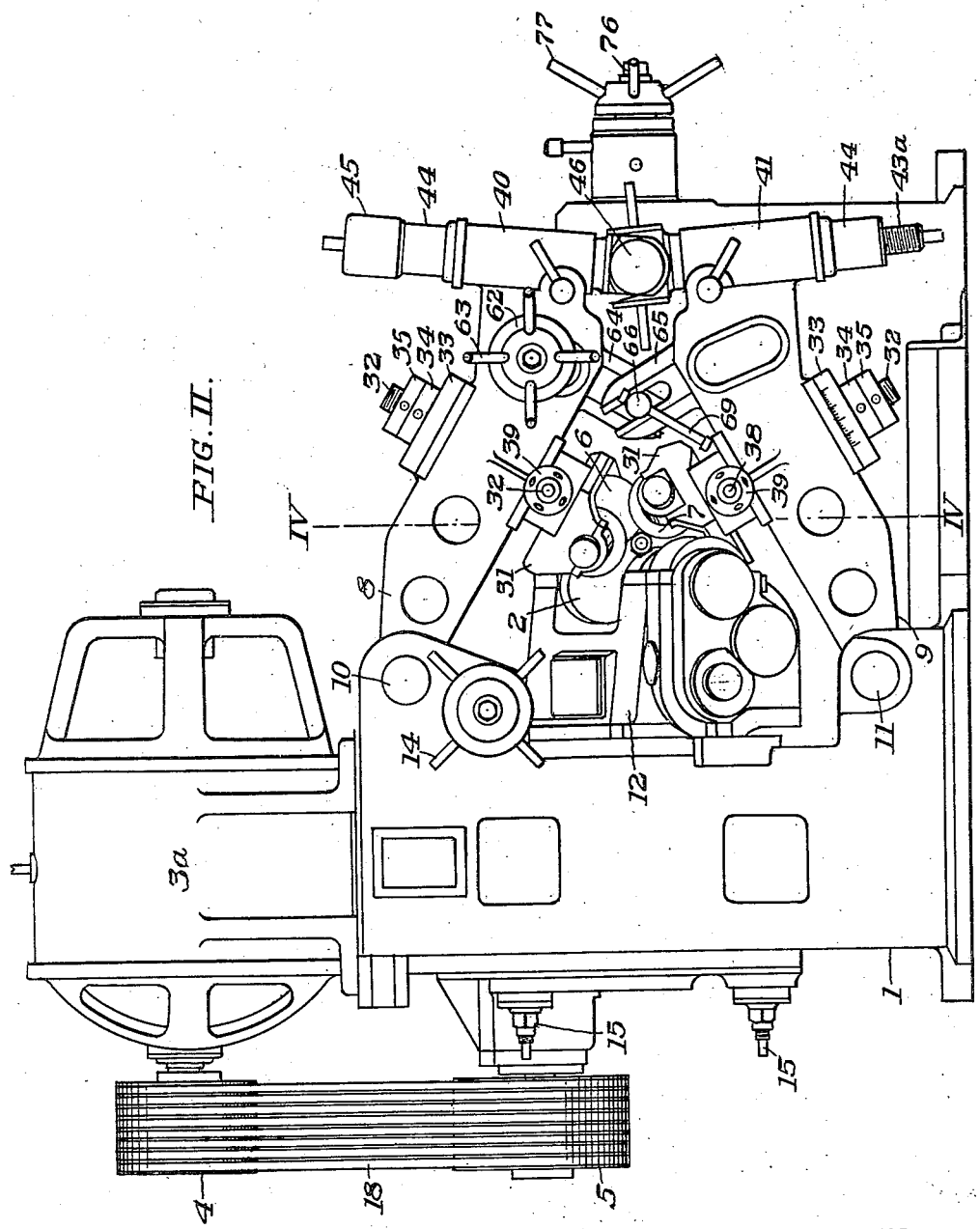

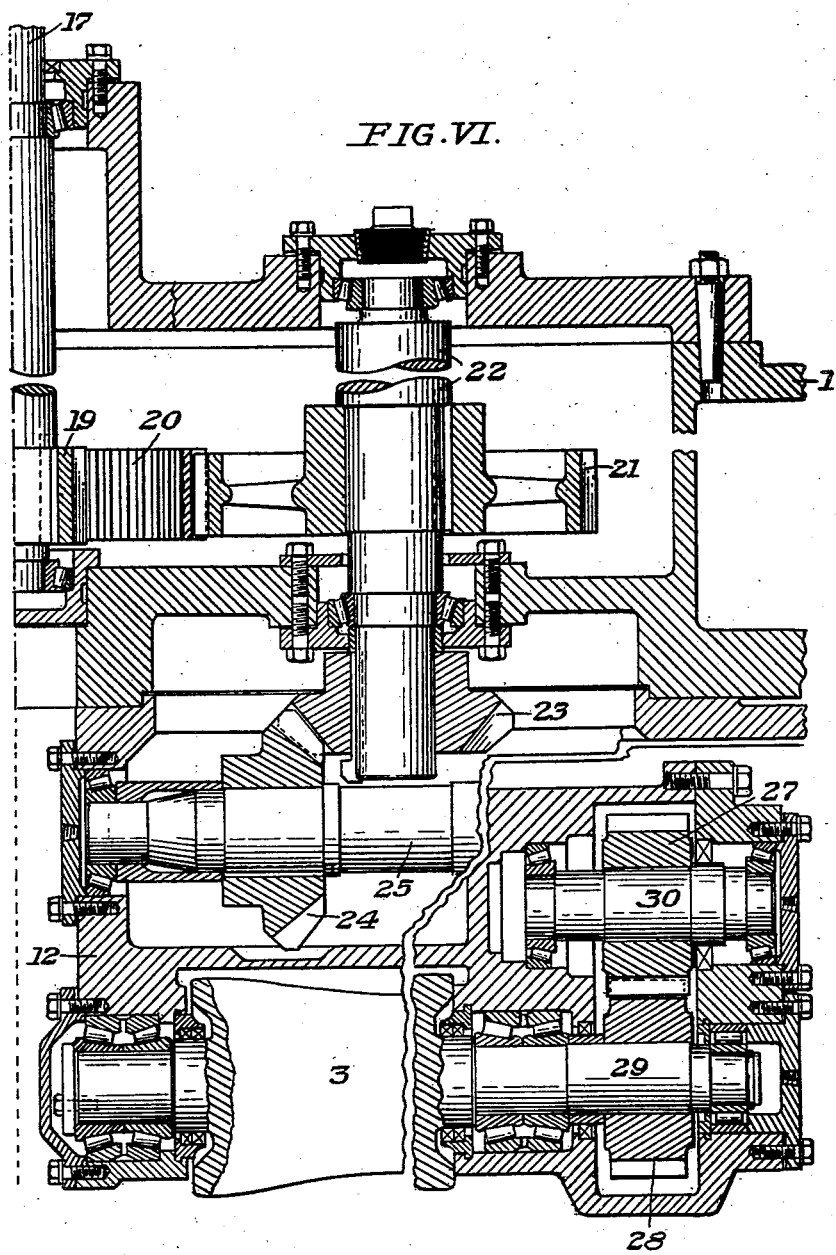
FIG. VI.

Dec. 7, 1948.  J. B. SUTTON  2,455,391
ROUND STRAIGHTENER
Filed Oct. 25, 1946  12 Sheets-Sheet 7
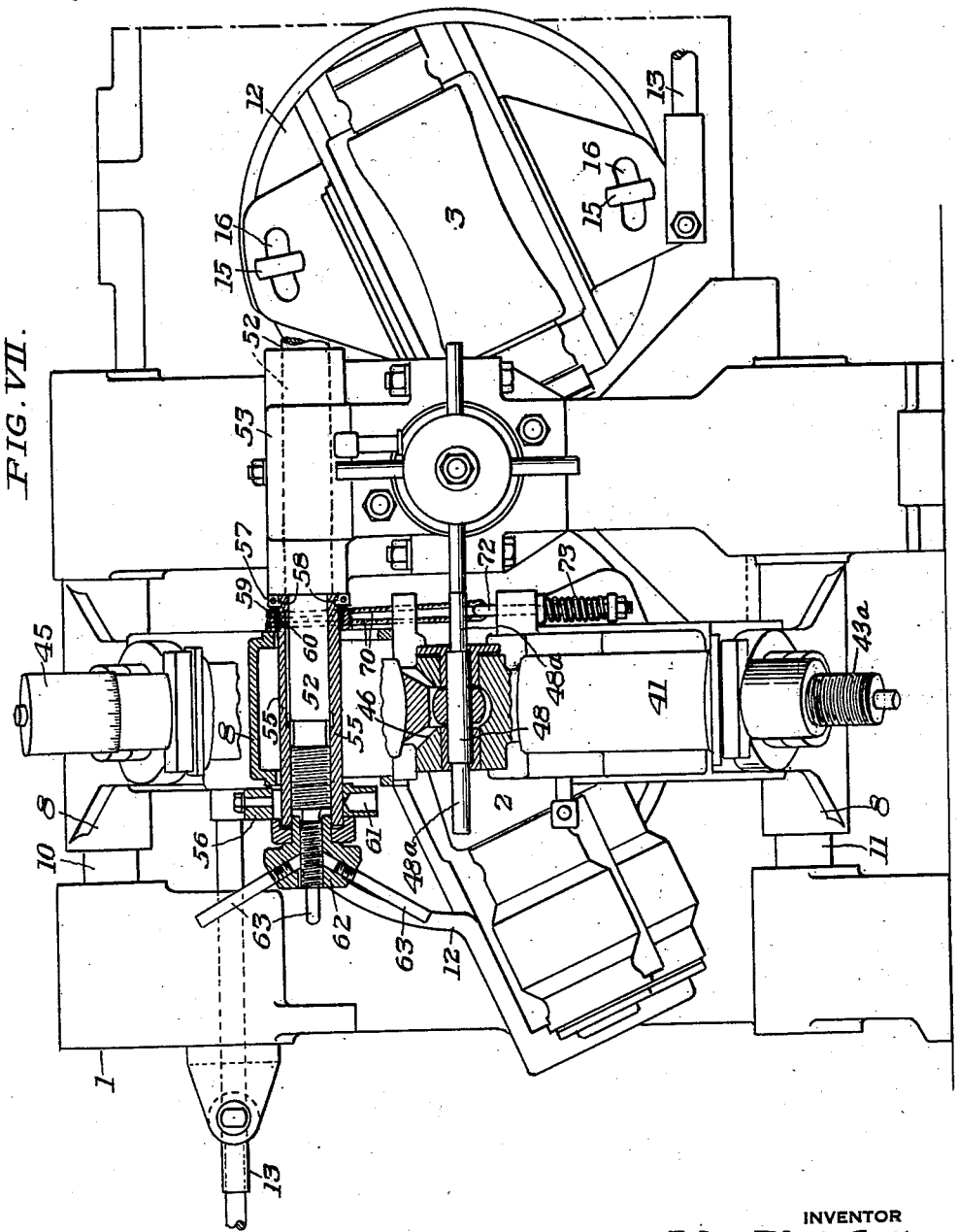
INVENTOR
John Blair Sutton
by William B. Wharton
his attorney Dec. 7, 1948.   J. B. SUTTON   2,455,391
ROUND STRAIGHTENER
Filed Oct. 25, 1946   12 Sheets-Sheet 8
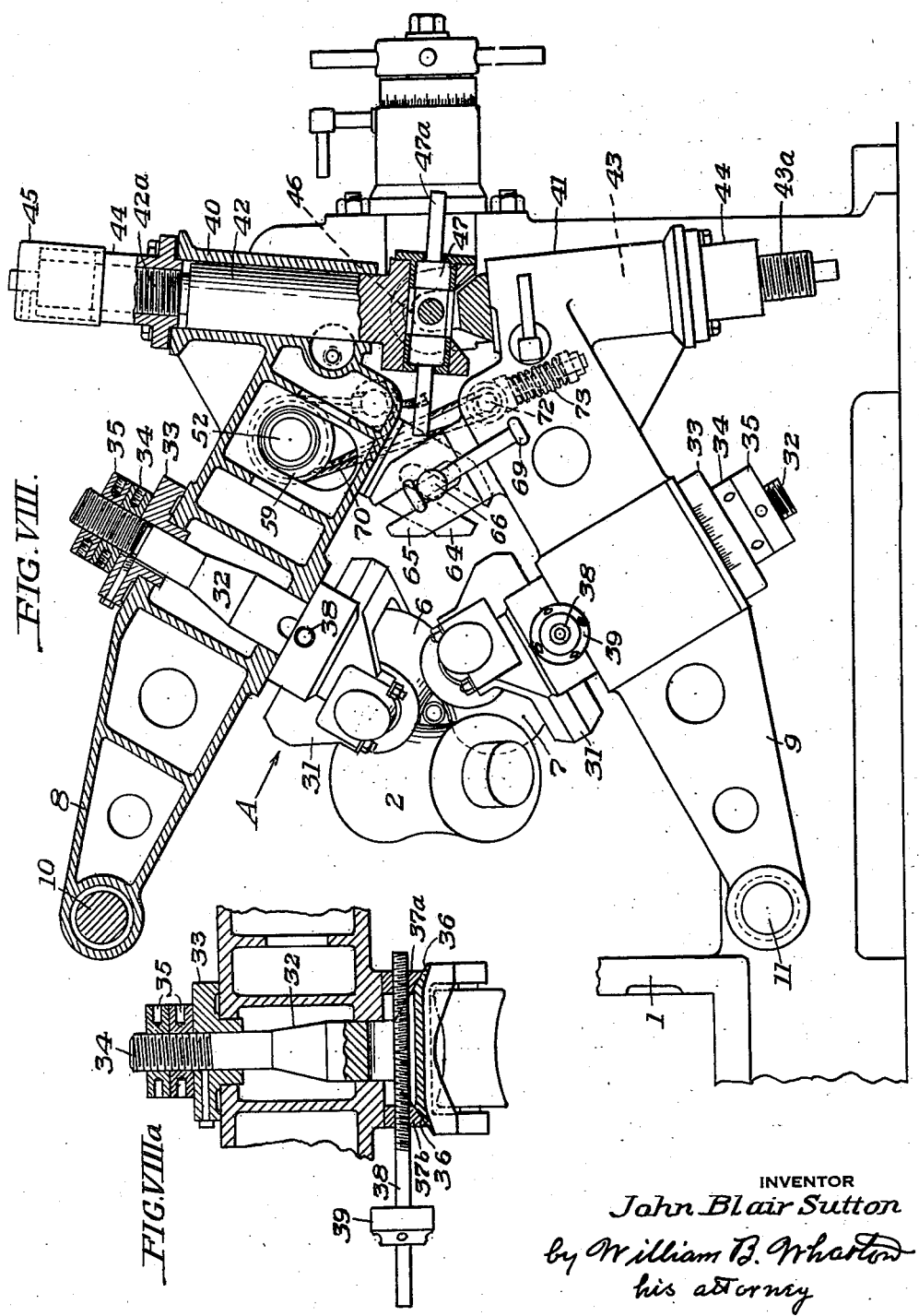
INVENTOR
John Blair Sutton
by William B. Wharton
his attorney Dec. 7, 1948.　　　　　　　J. B. SUTTON　　　　　　　2,455,391
ROUND STRAIGHTENER
Filed Oct. 25, 1946　　　　　　　　　　　　　　12 Sheets-Sheet 9
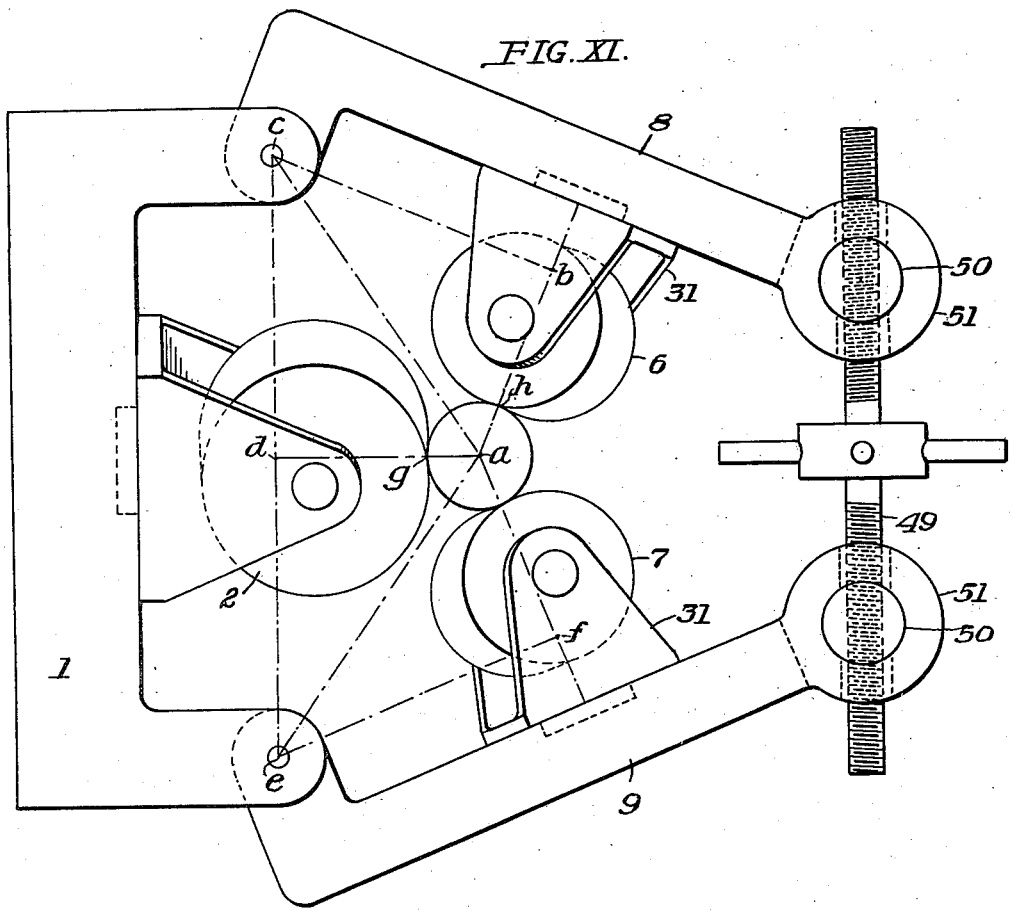
FIG. XI.
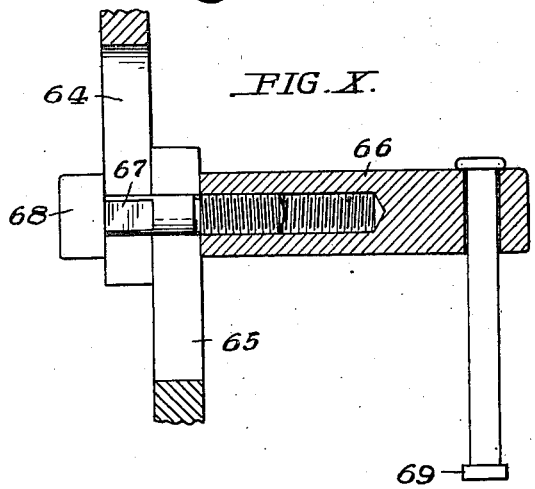
FIG. X.
INVENTOR
John Blair Sutton
by William B. Wharton
his attorney Dec. 7, 1948. J. B. SUTTON 2,455,391
ROUND STRAIGHTENER
Filed Oct. 25, 1946 12 Sheets-Sheet 10
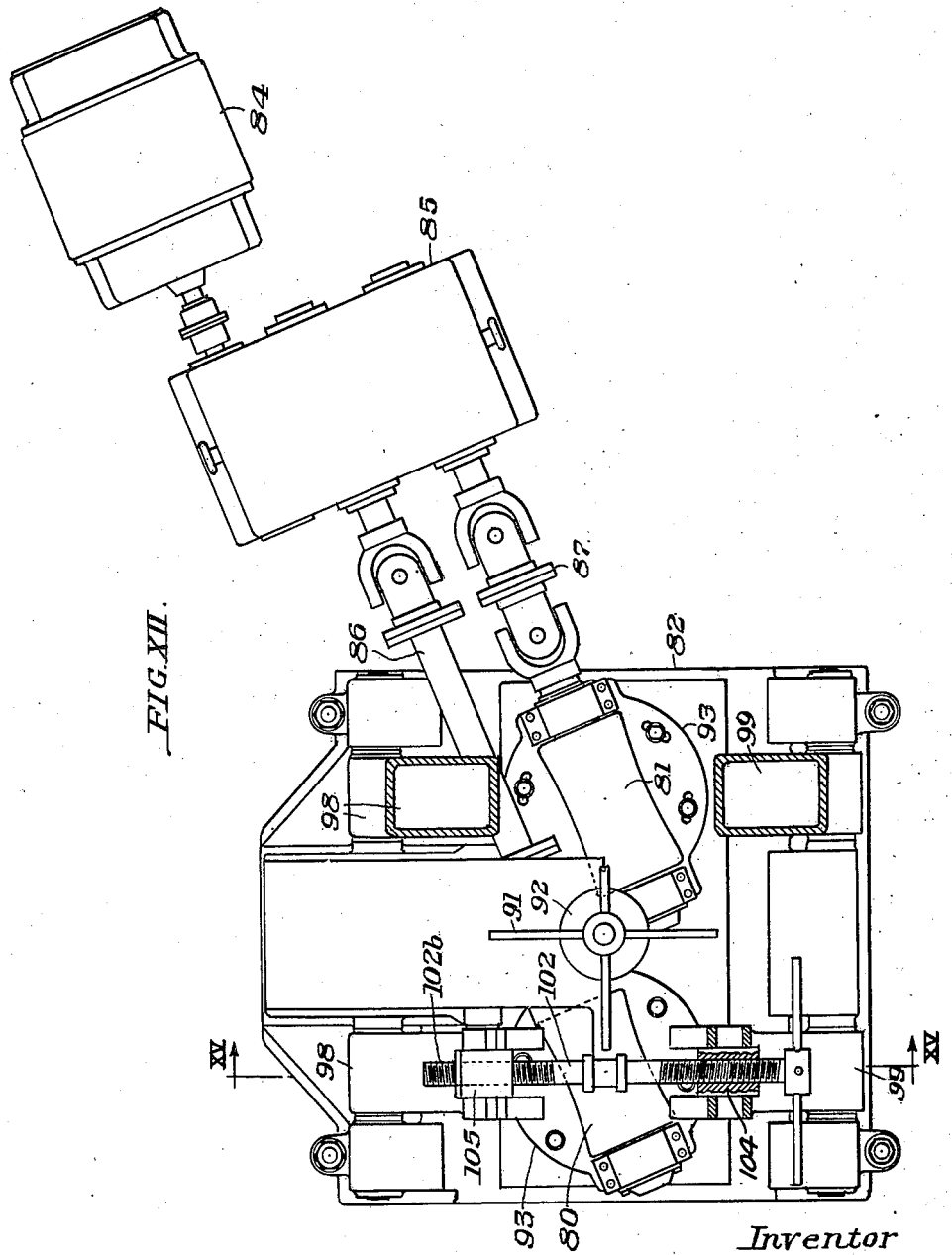
Inventor
John Blair Sutton
by William B. Wharton
his attorney Dec. 7, 1948.  J. B. SUTTON  2,455,391
ROUND STRAIGHTENER
Filed Oct. 25, 1946  12 Sheets-Sheet 11
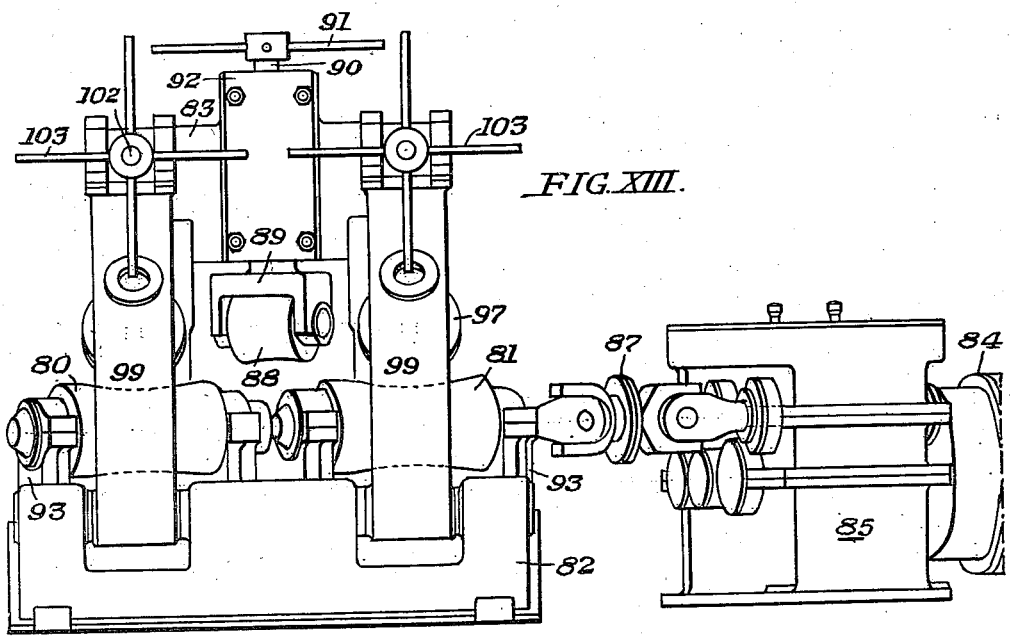
FIG. XIII.
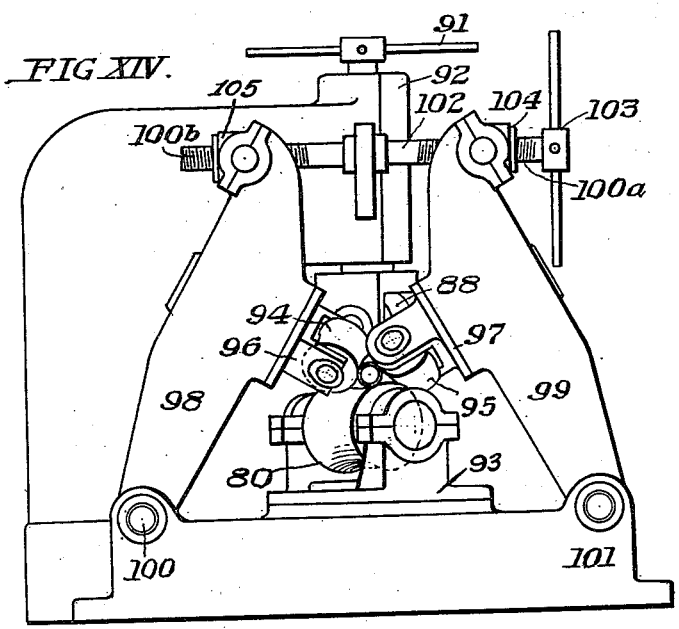
FIG. XIV.
Inventor
John Blair Sutton
by William B. Wharton
his attorney Dec. 7, 1948.  J. B. SUTTON  2,455,391
ROUND STRAIGHTENER
Filed Oct. 25, 1946  12 Sheets-Sheet 12
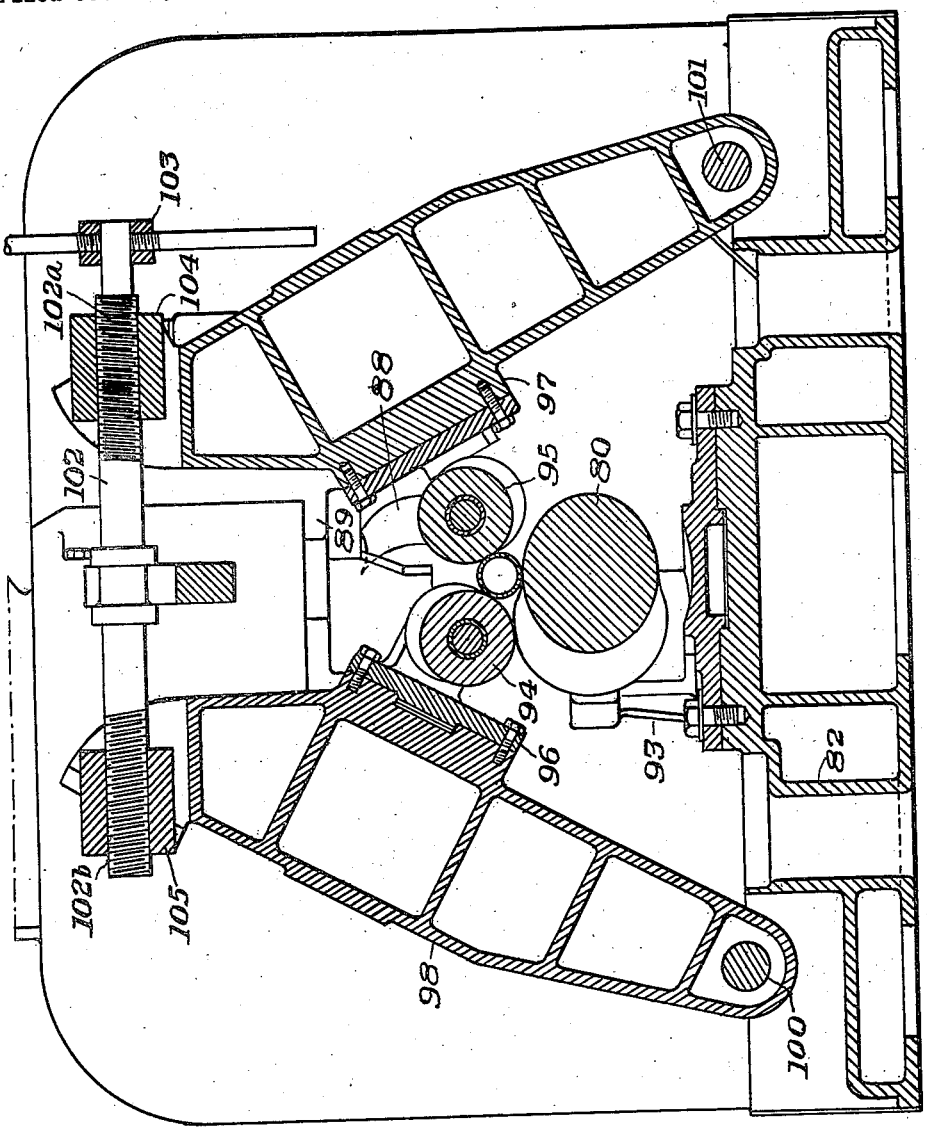
FIG. XV.
INVENTOR
John Blair Sutton
by William B. Wharton
his attorney.

Patented Dec. 7, 1948

2,455,391

UNITED STATES PATENT OFFICE 2,455,391

ROUND STRAIGHTENER

John Blair Sutton, Bellefonte, Pa., assignor to Sutton Engineering Company, Pittsburgh, Pa., a corporation of Pennsylvania Application October 25, 1946, Serial No. 705,778

15 Claims. (Cl. 153—69)

This invention relates to a straightening machine for round stock such as round bars, tubes and the like, and particularly to a cross-roll straightening machine of the sort formed of at least two passes each of which includes three rolls at least one of which is driven, together with at least one intermediate deflecting roll. The application herein is a continuation-in-part of my application Serial No. 549,581, filed August 15, 1944, now abandoned.

The object of the invention is to provide a straightening machine of the sort above indicated which provides great rigidity in the mounting and the backing of the several rolls of the three-roll passes, rendering the machine capable of severe working action with a minimum of weight in the frame and in the roll mounting and adjusting elements of the apparatus.

Another object of the invention is to provide straightening apparatus of the indicated sort which provides all necessary adjustments for effecting the desired straightening effect on stock, being adjustable satisfactorily to operate under either relatively light or relatively heavy pressure on the stock, and to do so within a satisfactory diameter range of the stock, and to provide in such a machine such visibility and accessibility of the machine elements that the effect of adjustments readily can be observed and particularly accurate adjustments can be made.

Another object of the invention is to provide a straightening machine of the above indicated sort which because of its open structural arrangement gives facilitated roll change and facilitates repair as well as adjustment.

As an ultimate object of my invention dependent primarily upon the attainment of the other objects above-noted, the apparatus is capable of heavy duty operation to correct ovality in the stock acted upon by the exertion of heavy pressure or to exert a light polishing action on the stock by exertion of light pressure, in addition to its primary function of correcting deviation of the stock from a straight axial line.

The three-roll group straightening machine of my invention is organized in accordance with a novel principle for mounting two rolls of each three-roll group for movement toward and from the pass line and toward and from the third roll, which because it may be mounted in set position properly may be considered as the "primary" roll of the group, the two other rolls movable toward and from the pass line being considered as the "secondary" rolls. For structural convenience and particularly to permit the inclusion of an intermediate deflecting roll between two three-roll groups without substantially extending the length of the machine, the secondary rolls are made relatively short with respect to the length of the primary roll in each of my three-roll groups. It is to be understood, however, that by increasing the over-all length of the machine all rolls of each three-roll group may be made of the same length and diameter.

In one modification of my invention, I use a vertical arrangement of the three rolls in each roll group, with two of the three rolls of the group movably so mounted with respect to the third roll and the pass line that in adjustment the elements carrying the two said rolls balance each other thus to render the provision of special counterbalancing means unnecessary.

In the accompanying drawings illustrating the desirable embodiment of my invention, Fig. I is a plan view of the straightening machine.

Fig. II is an end elevation thereof of the machine looking from the right of the sheet on which Fig. I is shown.

Fig. III is a side elevation of the machine looking from the top of the sheet on which Fig. I is shown.

Fig. IV is a vertical sectional view through the machine looking from the same direction as in Fig. III, this view being taken on the approximate section line IV—IV of Fig. II, but omitting the secondary rolls and mounting therefor which would be intersected by a plane taken directly through the machine on that section line.

Fig. V is a horizontal sectional view showing driving means for the primary roll of one three-roll group of the machine.

Fig. VI is a similar view showing driving connections for the primary roll of the other three-roll group of the machine.

Fig. VII is primarily a fragmentary side elevation corresponding to a regional enlargement of the showing of Fig. III, but omitting the two secondary rolls of one three-roll group and the mounting therefor, and showing in vertical section elements forming part of the means for advancing the two secondary rolls of a three-roll group toward and from the pass line, and elements of the means for producing longitudinal adjustment of the secondary rolls of the group.

Fig. VIII is a detail view of the machine structure which carries the secondary rolls of a three-roll group and of the means which provides the in and out adjustment of those rolls toward and away from the pass line, this view being taken partly in elevation and partly in vertical section.

Fig. VIIIa is a vertical sectional detail view of means for providing angular adjustment of the secondary rolls of a pass assembly.

Fig. IX is a longitudinal sectional detail view of connections for adjusting the secondary rolls of a three-roll group longitudinally of the machine.

Fig. X is a detail view showing means operable to interengage the structural organizations carrying the two secondary rolls of a three-roll group for adjustment longitudinally of the machine, and for disengaging those structural organizations for adjustment of the secondary rolls toward and from the pass line.

Fig. XI is a schematic view showing the pivoting of arms carrying the secondary rolls of a three-roll group, and illustrating the placing of the pivot points for those arms along such related lines as will give proper positioning of the rolls to form a pass for accommodating stock of different diameters.

Fig. XII primarily is a plan view of a modified form of the machine, the showing of this figure being simplified by the omission of some duplicated structural elements and by showing some structural elements in horizontal section.

Fig. XIII is a side elevation of the modified machine shown in Fig. XII.

Fig. XIV is an end elevation thereof.

Fig. XV is a cross-sectional view taken in the plane of the section line XV—XV of Fig. XII.

Referring first to the assembly views of the drawings and with reference to the form of the machine shown in Figs. I to XI inclusive, the machine comprises a main frame 1 which provides a base for the machine and housing for the rolls and their associated elements. The primary rolls 2 and 3 which are included respectively in the two three-roll groups designated generically A and B, are driven from motor 3a through multiple belt pulleys 4 and 5, and by means of driving connections hereinafter to be described.

The secondary rolls of both the three-roll groups A and B are designated in both groups by reference numerals 6 and 7. It is to be understood that generally considered the elements of both groups are identical and unless otherwise expressed in the specification, it is to be assumed that the elements of each of the groups has each its counterpart which may be designated by a like reference numeral in the other group. The secondary rolls 6 and 7 of each of the three-roll groups A and B are carried respectively by arms 8 and 9 which respectively are pivoted on shafts 10 and 11 mounted in vertical alignment in the machine frame. Means are provided for bringing together or separating the distal ends of the arms 8 and 9 to move the secondary rolls 6 and 7 toward and from the primary roll of the group along paths which position those rolls with respect to the primary roll to form a pass line for stock of different diameters.

In the organization the primary rolls 2 and 3 are driven, and it is to be understood that various suitable driving arrangements known to the art may be used to drive those rolls alternatively to the specific driving organization shown. One such driving organization now will be described. With reference particularly to Figs. IV to VI of the drawings it will be noted that each of the primary rolls 2 and 3 is mounted for angular adjustment of its longitudinal axis by having bearings in a roll yoke 12 rotatably mounted in the machine frame. Each of the roll yokes 12 is angularly adjustable by connection with a lead screw 13 and hand wheel 14, one being shown for each of the yokes. Roll yokes 12 are locked in adjusted position by means of screw bolts 15 having heads engaging with curved slots 16 in the roll yokes.

The requirement of the driving connections for both the primary rolls is that such connections be capable of driving the rolls in angularly adjusted positions of the yokes 12 which carry them. Such connections are shown in Figs. V and VI of the drawings which show connections for driving both the primary rolls 2 and 3 from a drive shaft 17 actuated from pulley 5 which receives power from motor pulley 4 through belts 18 (Fig. II). Shaft 17 carries a pinion 19 which drives an intermediate gear 20 meshing with gears 21 carried on shafts 22. Shafts 22 project through the frame or housing 1 of the machine and on the side of the frame toward the rolls each carries a bevel gear 23 which meshes with a bevel gear 24 carried by shaft 25 in the roll yoke 12. Shafts 25 each carries a gear 26 which through intermediate offset gear 27 drives gear 28 on the roll shaft 29. To clarify the showing of the arrangement, Fig. VI is broken regionally so that gear 26 is not shown, and the mounting of offset gear 27 on a stub shaft 30, which is not shown in Fig. V of the drawings, is shown in Fig. VI. By this driving assembly both the primary rolls receive their driving power from shaft 17 as a common driving source. In effecting angular adjustment of the rolls, the bracket 12 carrying the roll is rotated with respect to frame 1 and in this action bevel pinion 24 rolls around bevel pinion 23 on power transmitting shaft 22 which extends through the machine frame 1 into the body of the yoke or bracket. This driving organization may be considered to be conventional and, as above indicated, may in a general embodiment of my invention be replaced by any driving organization capable equivalently of permitting the needed angular adjustment of the roll yoke or bracket.

It has been above noted that the secondary rolls 6 and 7 of each three-roll group are carried by arms 8 and 9 which are pivotally mounted on longitudinally extended shafts 10 and 11 supported by the machine frame. In each of these arms the secondary rolls are mounted to extend angularly toward each other and toward the primary roll of the group. This mounting is such that secondary rolls 6 and 7 respectively extend inward from the inner surfaces of arms 8 and 9 each a regulable distance, and is such that the yokes carrying these rolls may be adjusted angularly with respect to the roll carrying arms which support them. As will be explained in connection with the diagrammatic showing of Fig. XI these normals intersect the center line of the pass formed by the three rolls of the group. The roll mounting comprises yoke 31 carried by a stem 32 projecting outwardly through the roll carrying arm and which is keyed to a micrometer hub 33. The outer region of the stem is threaded to engage a pair of nuts 34 and 35 bearing against hub 33. By rotating nuts 34 and 35 engaged with the stem of the roll yoke the roll is advanced or retracted a desired distance along the normal, and this individual adjustment of each of the two cooperative secondary rolls of the three-roll group may be used to compensate for inaccuracy in initial machining or unequal wear of the rolls. The roll yoke 31, as shown in Fig. VIIIa is formed regionally with a beveled upper surface 36 against which lie the oppositely inclined faces of wedges 37a and 37b having threaded engagement respectively with right and left hand threads on the threaded end of an operating rod 38, which rod carries a hub 39. To make angular adjustment, hub 39 is engaged by a suitable instrument and rod 38 is rotated to separate wedges 37a and 37b. After the wedges have been separated sufficiently by rotation of rod 38 to permit angular movement of the roll yoke, the shaft 38 is used as a lever angularly to swing roll yoke 32 to an adjusted position.

It will be apparent from observing the arrangement of roll carrying arms 8 and 9 and the relation of the rolls carried thereby with a primary roll, shown as the primary roll 2 in Fig. II of the drawings and so designated in Fig. VIII, that movement of the secondary rolls toward and from the pass line to form the pass cooperatively with the primary roll is effected by swinging arms 8 and 9 closer together to advance the secondary rolls and by separating the arms to retract the secondary rolls. Referring to all of Figs. II, VII and VIII, it will be seen that the ends of arms 8 and 9 are formed as cylindrical housings 40 and 41 in which lie the two members 43 and 42 of a divided adjusting shaft. To each of the housings there is secured a screw box 44 in which are threaded extensions 42a and 43a of the divided adjusting shafts 42 and 43 respectively. At its end, member 42 of the divided adjusting shaft is provided with a cup shaped micrometer dial 45. The two elements 42 and 43 of the divided shaft have a universal joint interconnection associated with means for rotating the elements of the shaft and by that rotation and by their threaded engagement with screw boxes 44, to exert a force tending to move the arm housings 40 and 41.

Whereas the entire length of element 43 of the divided adjusting shaft is not exposed in Fig. VIII of the drawings it may be explained that it is threaded to its screw box oppositely to the threading of the other element 42 of the divided shaft, so that the effect of rotating the two shaft elements 42 and 43 is opposite with respect to the two roll-carrying arms 8 and 9. Thus if the direction of rotation of the divided shaft is such that it tends to move the screw boxes and the cylindrical housings which carry them away from each other, the result is to separate the adjacent ends of the arms in swinging the arms about their pivot shafts 10 and 11, and thus to retract secondary rolls 6 and 7 from the primary roll and the pass line. Opposite movement brings the arms closer together, and thus advances the secondary rolls toward the primary roll and the pass line. In this connection resolution of the difference between arcuate movement of the roll-carrying arms and straight line movement of the elements 42 and 43 of the divided shaft is compensated by universal joint 46 interconnecting the shaft elements 42 and 43. The means for rotating the elements 42 and 43 of the divided shaft is associated with the universal joint 46. In the structure of universal joint 46 journal pins 47 and 48 have extensions 47a and 48a by which the divided shaft is rotated.

Reference should now be had to Fig. XI which shows a primary roll 2, secondary rolls 6 and 7, and the roll-carrying arms 8 and 9, and which indicates the centers of the adjusting movement of the roll-carrying arms. It is to be noted that for convenience of illustration, Fig. XI shows modified means for separating and bringing together the roll-carrying arms 8 and 9 to retract or advance the secondary rolls. Such means is shown as an adjusting shaft 49 having oppositely threaded regions which engage in nuts 50 having a rotatable mounting in eyes 51 at the ends of roll-carrying arms 8 and 9. In function this is the equivalent of the organization shown in Figs. VII and VIII and which has been described immediately above. In the diagram the pivot points of roll-carrying arms 8 and 9 are designated $c$ and $e$ and are connected by a straight line equally divided at a point $d$. Diagonals $ca$ and $ea$ intersect at the point $a$, which is the center line of the stock worked in the machine. Further to describe the roll arrangement, it will be noted that the pivot point $c$ is located on the line dividing angle $dab$ in half, and triangle $abc$ is identical to triangle $adc$. Also line $ab$ equals line $ad$, or otherwise expressed $bh + ha = ag + gd$. The two dimensions $ha$ and $hg$ are equal and are equal to the radius of the stock to be straightened. They may be cancelled in the equation given above, and it can be taken that the center lines $ab$ and $ad$ always will intersect at the center of stock of any diameter. The relations of the angle $daf$ for the lower secondary roll 7 are identical with those above described for the angle $dab$ relating to the adjustment of the upper secondary roll 6. Thus in principle the diameter of the stock is of no importance, and the other limitations on the range of diameters which satisfactorily may be worked in the machine are physical. This is true so long as the pivot points lie anywhere along the lines $ca$ and $ea$, or extensions of them.

Means are provided for counterbalancing arms 6 and 7 of each three-roll group and for providing adjustment of those arms longitudinally of the pass line.

Referring particularly to Figs. VII and IX, a longitudinal shaft 52 is mounted in fixed position in housing 53, comprised in the machine frame and which serves as the housing for an intermediate pressure roll 54. A sleeve 55 is internally threaded to a threaded portion of shaft 52 and engages the upper roll-carrying arm 8 of the assembly. At the outer side of the arm 8 there is a collar 56 keyed to sleeve 55 and bearing against the adjacent side of the roll-carrying arm. At the other and inner side of the roll-carrying arms there is a split collar 57 which has an interlocking engagement at 58 with sleeve 55, and in interposed sheave 59 and bushing 60 fill the interval between split collar 58 and the adjacent side of the roll-carrying arm. Roll-carrying arm 8 is thus engaged with sleeve 55 for movement longitudinally of the pass line. In order to produce longitudinal adjustment of the arm in either direction a lever is inserted in socket 61 provided in collar 56, and that collar together with sleeve 55 to which it is keyed is moved longitudinally by its threaded engagement with the fixed shaft 52. A hub 62 with arms 63 serves as a lock to secure sleeve 55 against rotation.

To produce identical longitudinal movement of lower roll-carrying arm 9, without placing an undue strain on universal joint 46, arms 8 and 9 are provided respectively with forks 64 and 65 (Figs. II, VIII and X) the slots of which are crossed. Extending through the slots of both forks 64 and 65 in the region where the slots cross there is a pin 66 having tapped into it a stud 67 with an enlarged head 68. A handle 69 serves to rotate pin 66 to loosen or tighten its inter-engagement of forks 64 and 65. Pin 66 is loosened to permit relative swinging movement of arms 8 and 9 and is tightened for normal operation of the machine and for longitudinal adjustment of the arms.

It is, of course, to be understood that the above organization is duplicated in detail in each of the three-roll groups A and B.

Roll-carrying arms 8 and 9 desirably are counterbalanced with each other to facilitate swinging adjustment of the arms. For this purpose a cable 70 passes over sheave 59 which has been mentioned above in connection with the longitudinal adjustment of the roll-carrying arms, and has a fixed point of attachment 71 on roll-carrying arm 8. The other terminal of the cable is engaged to roll-carrying arm 9 by a hooked stem 72 which is attached to compression spring 73. The function of spring 73 in the organization is to compensate for the unsymmetrical fixed position of sheave 59 over which cable 70 passes.

Between the two three-roll groups A and B there is the conventional intermediate deflecting roll 54 carried by roll yoke 74; which is mounted in housing 53 for rotation and for transverse adjustment to a position out of line with a pass line formed by the longitudinally aligned roll groups A and B, by contacting the stock to deflect it from the pass line. Rotation and transverse adjustment of intermediate deflecting roll 54 is provided in a manner currently well known in the art, and as shown generally for example in United States Patent to Thomas W. Hartley No. 1,832,631. Thus roll yoke 74 has a stem 75 which has both rotation and sliding adjustment in housing 52 forming part of the machine frame. An adjusting screw 76, having a hand wheel 77, and which is connected with the stem 75 of the roll yoke through a screw box, (not shown), produces transverse adjustment of the roll yoke, and shell 78 on stem 75 of the roll yoke has handles 79 which are swung to produce angular adjustment of intermediate deflecting roll 54 about the axis of the roll yoke stem.

The great advantage of a machine in accordance with this invention rises from the mounting of the secondary rolls of each roll group on relatively heavy arms, and the pivoting of those arms to swing the short distance necessary to advance or retract the rolls in accommodating the pass line of the machine to stock of different diameters. That organization mounts the secondary rolls without over-hang, and in such manner that each of the secondary rolls is backed directly by the mass of the arm which supports it. This minimizes springing of the rolls in use of the machine and it is obvious that if the exigencies of the work require backing of unusually great mass for the rolls, such backing may be provided simply by increasing the weight of the roll-carrying arms without otherwise altering the design of the machine. Also the primary element of the invention, namely, the mounting of the secondary rolls of the three-roll groups may be incorporated in machines showing substantial variation in structural organization and arrangement from the machine shown and described as embodying the invention. The machine as a whole, without substantial difference in the arrangement or individual form of any of its parts, obviously may be arranged vertically rather than horizontally as shown.

In the modification shown in Figs. XII to XV inclusive of the drawings, the swinging roll-carrying arms both are pivoted at their lower ends to extend upward and angularly toward each other. As will appear, the effect of this mounting is to cause the arms to counterbalance each other in their adjusting movement. In order to make this counterbalancing mounting of the three-roll group possible, I utilize the vertical arrangement of the rolls referred to above.

In this modification the "primary" rolls 80 and 81 are mounted on a base 82 of a frame which comprises the upwardly extended housing 83. Rolls 80 and 81 are, as shown, driven by an electric motor 84 through speed-reduction box 85 and flexible shafts 86 and 87. An intermediate deflecting roll 88 is carried from the main housing 83 of the frame, above rolls 80 and 81 and longitudinally between them. This roll is mounted in roll yoke 89 for both angular and vertical adjustment. The adjusting elements, of which adjusting screw 90 and hand wheel 91 are shown, are conventional and may be identical with corresponding elements as shown in Figs. I to XI inclusive of the drawings. The only substantial difference is that the housing 92 which directly carries roll yoke 89 and deflecting roll 88 is in over hung relation to the pass line rather than mounted in lateral relation thereto.

Angular adjustment of rolls 80 and 81 is provided by rotation of their yokes 93 on the base 82 of the machine. The flexibility of drive shafts 86 and 87 permits sufficient angular adjustment of these rolls to provide desirable conditions with changes in the size of the pass to accommodate differing stock diameters.

With each of the primary rolls 80 and 81 there is associated a pair of secondary rolls 94 and 95. These rolls are carried directly by roll yokes 96 and 97 which are rotatably mounted on swinging arms 98 and 99. In the machine assembly, it is to be understood that each pair of secondary rolls is carried by an individual pair of swinging arms, one pair of such arms and the secondary rolls carried thereby being truncated from Fig. XII, the better to expose a primary roll at one end of the machine.

As appears most clearly in Figs. XII and XIV, one of the swinging arms of each cooperative pair is rotatable on one of two shafts 100 and 101 which extend longitudinally at both sides of the base. From this mounting, they extend upwardly and normally incline toward each other at their upper ends. Thus swinging movement of arms 98 and 99 causes the secondary rolls to approach or to recede from each other and from their associated primary roll along arcuate paths.

Swinging movement of each pair of roll-carrying arms is equally and simultaneously caused by adjusting screw 102 and its hand wheel 103. Adjusting screw 102 has oppositely threaded regions 102a and 102b which cooperate with screw boxes 104 and 105 engaged respectively to swivel in arms 98 and 99. Rotation of adjusting screw 102 in one direction of rotation thus swings arms 98 and 99 about their mounting shafts 100 and 101, to cause the distal ends of the arms to approach each other, and rotation in the other direction causes them to move apart.

The effect of gravity on both the arms 98 and 99 being at all times equal and the swinging movement of the arms being equal and simultaneous, the arms of each pair counterbalance each other during their swinging movement. This avoids necessity for the use of counterbalancing means such as those disclosed in connection with the form of the machine shown in Figs. I to XI inclusive. A marked advantage derived from the mounting of two rolls of each three-roll group on swinging arms is in the accessibility to the rolls which it provides. This is much greater in the case of the vertically arranged arms of the form of the machine shown in Figs. XII to XV than when one of the roll-carrying arms is in an overlying relation to the rolls. In this modified form of the machine roll changes can be made by vertical removal and replacement of rolls, simply by producing a sufficiently wide separation of the upper, or distal, ends of the arms.

Also, if desired, the secondary rolls may be made of equal length with the primary roll toward and from which they are adjusted, such modification requiring merely an elongation of the machine as a whole to provide space for the intermediate pressure roll between the three-roll groups of the machine. Also with but slight structural modification along lines well known in the art, the intermediate deflecting roll may be replaced by a two-roll or three-roll deflecting group adjustable as a group transversely of the pass line. Also the number of roll groups which define the entire length of the straightening pass may be increased if so desired.

All of such structural modifications, and various other modifications, may be made by any skilled worker in the art of cross-roll straightening machines without substantial modification in those elements of my machine organization in which novelty primarily resides, and having exemplified my invention by showing and describing one apparatus embodiment thereof, that invention is to be limited only by the statement of the claims appended hereto.

I claim as my invention:

1. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, means for swinging the said arms, a roll yoke on each said roll-carrying arm, two secondary rolls carried by said roll yokes in opposition to each other and to the said primary roll to form with the primary roll a pass of regulable diameter for the reception of round stock therebetween, and means adjustably mounting each of the said roll yokes in its associated roll-carrying arm for movement of its associated roll toward and away from the center line of the pass independently of movement of the said swinging arm.

2. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, a roll yoke on each said roll-carrying arm, two secondary rolls carried by said roll yokes in opposition to each other and to said primary roll to form with the primary roll a pass of regulable diameter for the reception of round stock therebetween, means for swinging the said arms, and means associated with each roll yoke to rotate the same in its associated arm about an axis normal to the axis of rotation of its associated roll and intersecting the center line of the pass.

3. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, means for swinging the said arms, a roll yoke on each said roll-carrying arm, two secondary rolls carried by said roll yokes in opposition to each other and to the said primary roll to form with the primary roll a pass of regulable diameter for the reception of round stock therebetween, means adjustably mounting each of the said roll yokes in its associated roll-carrying arm for movement of its associated roll toward and away from the center line of the pass independently of movement of the said swinging arm, and means associated with each roll yoke to swing the same in its associated arm about an axis normal to the axis of its associated roll and intersecting the center line of the pass.

4. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, means for causing swinging movement of the said arms, and two secondary rolls carried each by one of the said pivotally mounted arms in opposition to each other and to the said primary roll for movement toward and away from each other along arcuate paths to form with the said primary roll a pass of regulable diameter for the reception of round stock therebetween.

5. In a cross-roll straightening machine having plural three-roll passes and including at least one roll arranged to deflect stock from the pass-line of the machine; a pass assembly comprising a frame, a primary roll mounted in said frame, two angularly extended roll-carrying arms mounted in said frame and converging toward each other away from the said primary roll, a roll yoke on each said roll-carrying arm, two secondary rolls carried by said roll yokes in opposition to each other and to the said primary roll to form with the said primary roll a pass for the reception of round stock therebetween, and means adjustably mounting each of the said roll yokes in its associated roll-carrying arm for movement of its associated roll toward and away from the pass with respect to the position of the arm in which it is mounted.

6. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, means for causing swinging movement of the said arms, and two secondary rolls carried each by one of the said pivotally mounted arms in opposition to each other and to the said primary roll for movement toward and away from each other along arcuate paths to form with the said primary roll a pass of regulable diameter for the reception of round stock therebetween, the two said roll-carrying arms being slidably adjustable on their pivots longitudinally of the machine frame, and means for effecting longitudinal adjustment of the said roll-carrying arms.

7. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, means for causing swinging movement of the said arms, and two secondary rolls carried each by one of the said pivotally mounted arms in opposition to each other and to the said primary roll to form with the said primary roll a pass of regulable diameter for the reception of round stock therebetween, the two said roll-carrying arms being slidably adjustable on their pivots longitudinally of the machine frame, means for effecting longitudinal adjustment of the said roll-carrying arms, and means associated with each said secondary roll to rotate the same in its associated arm about an axis normal to the axis of rotation of its associated roll and intersecting the center line of the pass.

8. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, means for causing swinging movement of the said arms, and two secondary rolls carried each by one of the said pivotally mounted arms in opposition to each other and to the said primary roll to form with the said primary roll a pass of regulable diameter for the reception of round stock therebetween, the two said roll-carrying arms being slidably adjustable on their pivots longitudinally of the machine frame, means for effecting longitudinal adjustment of the said roll-carrying arms, and means adjustably mounting each of the said roll yokes in its associated roll-carrying arm for movement of its associated roll toward and away from the pass with respect to the position of the arm in which it is mounted.

9. In a cross-roll straightening machine having plural three-roll passes and including at least one roll arranged to deflect stock from the pass-line of the machine; a pass assembly comprising a frame, a primary roll mounted in said frame, two roll-carrying arms pivotally mounted for swinging movement toward and away from each other, means for causing swinging movement of the said arms, and two secondary rolls carried each by one of the said pivotally mounted arms in opposition to each other and to the said primary roll to form with the said primary roll a pass of regulable diameter for the reception of round stock therebetween, the two said roll-carrying arms being slidably adjustable on their pivots longitudinally of the machine frame means for effecting longitudinal adjustment of the said roll-carrying arms, means adjustably mounting each of the said roll yokes in its associated roll-carrying arm for movement of its associated roll toward and away from the pass with respect to the position of the arm in which it is mounted, and means associated with each roll yoke to rotate the same in its associated arm about an axis normal to the axis of rotation of its associated roll and intersecting the center line of the pass.

10. In a cross-roll straightening machine having plural three-roll passes and including at least one roll arranged to deflect stock from the pass-line of the machine; a pass assembly comprising a frame, a primary roll mounted in said frame, two angularly extended roll-carrying arms pivotally mounted in said frame and converging away from the said primary roll, a roll yoke on each said roll-carrying arm, two secondary rolls carried by said roll yokes in opposition to each other and to the said primary roll to form with the said primary roll a pass for the reception of round stock therebetween, ways on which the two said roll-carrying arms are adjustable longitudinally of the machine frame, means for effecting longitudinal adjustment of the said roll-carrying arms, and means associated with each roll yoke to rotate the same in its associated arm about an axis normal to the axis of rotation of its associated roll and intersecting the center line of the pass.

11. In a cross-roll straightening machine a three-roll pass assembly comprising a frame, a primary roll mounted in said frame, two secondary roll yokes, two secondary rolls carried by said roll yokes in opposition to each other and to the said primary roll to form with the said primary roll a pass of regulable diameter for round stock received therein, movable mounting means for mounting the said roll yokes and the secondary rolls carried thereby arranged to move the said secondary rolls through arcuate paths centered on lines bisecting angles formed by lines extended through the center of the stock and the respective centers of the said secondary rolls with a line extended from the center of the stock through the center of the primary roll, and means for moving the said movable roll-mounting means.

12. In a cross-roll straightening machine a three-roll pass assembly comprising a frame, a primary roll mounted in said frame, two secondary roll yokes, two secondary rolls carried by said roll yokes in opposition to each other and to the said primary roll to form with the said primary roll a pass of regulable diameter for round stock received therein, movable mounting means for mounting the said roll yokes and the secondary rolls carried thereby arranged to move the said secondary rolls through arcuate paths centered on lines bisecting angles formed by lines extended through the center of the stock and the respective centers of the said secondary rolls with a line extended from the center of the stock through the center of the primary roll, means for moving the said movable roll-mounting means, and means associated with each said secondary roll yoke to swing the same in its associated movable mounting means about an axis coincident with the said line extended from the center of the pass through the center of the said secondary roll.

13. In a cross-roll straightening machine having plural three-roll passes and at least one roll arranged to deflect stock from the pass-line of the machine; pass assembly comprising a frame, a primary roll mounted at the base of said frame, two roll-carrying arms pivotally supported in said frame both to extend vertically upward from their pivot points, means for swinging said arms to cause their upper ends to approach and recede from each other, a roll yoke on each said roll-carrying arm, and two secondary rolls carried by said roll yokes in opposition to each other and to the said primary roll to form with the primary roll a pass of regulable diameter for the reception of round stock therebetween.

14. In a cross-roll straightening machine having plural three-roll passes and at least one roll arranged to deflect stock from the pass-line of the machine; a pass assembly comprising a frame, a primary roll mounted at the base of said frame, two roll-carrying arms pivotally supported in said frame both to extend vertically upward from their pivot points, means for swinging said arms to cause their upper ends to approach and recede from each other, a roll yoke on each said roll-carrying arm, and two secondary rolls carried by said roll yokes in opposition to each other and to the said primary roll to form with the primary roll a pass of regulable diameter for the reception of round stock therebetween, each said roll yoke being rotatable in its associated arm about an axis normal to the axis of rotation of its associated roll.

15. In a cross-roll straightening machine having plural three-roll passes and at least one roll arranged to deflect stock from the pass-line of the machine; a pass assembly comprising a frame, a primary roll mounted at the base of said frame, two roll-carrying arms pivotally supported in said frame both to extend vertically from their pivot points, means for swinging said arms to cause their upper ends to approach and recede from each other, and two secondary rolls carried by said swinging arms in opposition to each other and to said primary roll to form with the primary roll a pass of regulable diameter for the reception of round stock therebetween.

JOHN BLAIR SUTTON.

REFERENCES CITED

The following references are of record in the file of this patent:

UNITED STATES PATENTS

| Number | Name | Date |
|---|---|---|
| 250,627 | Blakey | Dec. 6, 1881 |
| 2,323,946 | Sutton | July 13, 1943 |